United States Patent
Rofougaran

(10) Patent No.: US 7,787,834 B2
(45) Date of Patent: Aug. 31, 2010

(54) VOICE, DATA AND RF INTEGRATED CIRCUIT WITH OFF-CHIP POWER AMPLIFIER AND METHODS FOR USE THEREWITH

(75) Inventor: Ahmadreza (Reza) Rofougaran, Newport Coast, CA (US) 92657

(73) Assignee: Broadcom Corporation, Irvine, CA (US)

( * ) Notice: Subject to any disclaimer, the term of this patent is extended or adjusted under 35 U.S.C. 154(b) by 519 days.

(21) Appl. No.: 11/703,994

(22) Filed: Feb. 8, 2007

(65) Prior Publication Data

US 2008/0194216 A1  Aug. 14, 2008

(51) Int. Cl.
*H01Q 11/12*   (2006.01)
*H04B 1/04*    (2006.01)
*H04B 1/28*    (2006.01)

(52) U.S. Cl. .................. 455/91; 455/127.1; 455/333
(58) Field of Classification Search .............. 455/91, 455/101–104, 114.1–116, 126–127.5, 333, 455/572; 375/296–297, 312
See application file for complete search history.

(56) References Cited

U.S. PATENT DOCUMENTS

| | | | |
|---|---|---|---|
| 6,265,935 B1 * | 7/2001 | Kaneda et al. .................. 330/51 |
| 6,784,748 B1 * | 8/2004 | Canyon et al. ................ 330/296 |
| 6,794,935 B2 * | 9/2004 | Klomsdorf et al. ........... 330/129 |
| 7,155,251 B2 * | 12/2006 | Saruwatari et al. ......... 455/552.1 |
| 7,197,286 B2 * | 3/2007 | Ode et al. .................. 455/114.3 |
| 7,333,564 B2 * | 2/2008 | Sugiyama et al. ............ 375/297 |
| 7,346,318 B2 * | 3/2008 | Tsutsui et al. ............. 455/127.4 |
| 7,457,617 B2 * | 11/2008 | Adams et al. ................ 455/418 |
| 7,493,094 B2 * | 2/2009 | Ichitsubo et al. .......... 455/127.1 |
| 2006/0189285 A1 * | 8/2006 | Takano et al. ............. 455/127.2 |
| 2007/0190952 A1 * | 8/2007 | Waheed et al. ............ 455/114.3 |
| 2007/0259628 A1 * | 11/2007 | Carmel et al. ............. 455/127.1 |

* cited by examiner

*Primary Examiner*—Simon D Nguyen
(74) *Attorney, Agent, or Firm*—Garlick Harrison & Markison; Bruce E. Stuckman

(57) ABSTRACT

A voice data and RF integrated circuit (IC) includes an RF transmitter, that generates an RF signal to a power amplifier module. A memory module stores a least one application as a plurality of operational instructions, the at least one application having a plurality of modes that each correspond to one of a plurality of use characteristics. A processing module executes the plurality of operational instructions and determines a selected one of the plurality of modes based on current use characteristics of the at least one application, and generates at least one control signal based on the selected one of the plurality of modes. A bias control generator generates a bias control signal in response to the at least one control signal, to control the biasing of the power amplifier module.

7 Claims, 13 Drawing Sheets

VOICE, DATA AND RF INTEGRATED CIRCUIT WITH OFF-CHIP POWER AMPLIFIER AND METHODS FOR USE THEREWITH

BACKGROUND OF THE INVENTION

1. Technical Field of the Invention

This invention relates generally to mobile communication devices and more particularly to a circuit for managing power in a combined voice, data and RF integrated circuit.

2. Description of Related Art

As is known, integrated circuits are used in a wide variety of products including, but certainly not limited to, portable electronic devices, computers, computer networking equipment, home entertainment, automotive controls and features, and home appliances. As is also known, integrated circuits include a plurality of circuits in a very small space to perform one or more fixed or programmable functions.

Power management can be an important consideration for electronic devices, particularly for mobile devices that operate from battery power. Lowering the power consumption of a device can increase battery life, or conversely, can potentially decrease the size of the battery that is required, with a corresponding decrease in weight and size.

The advantages of the present invention will be apparent to one skilled in the art when presented with the disclosure herein.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

DETAILED DESCRIPTION OF THE INVENTION

Figure 1:
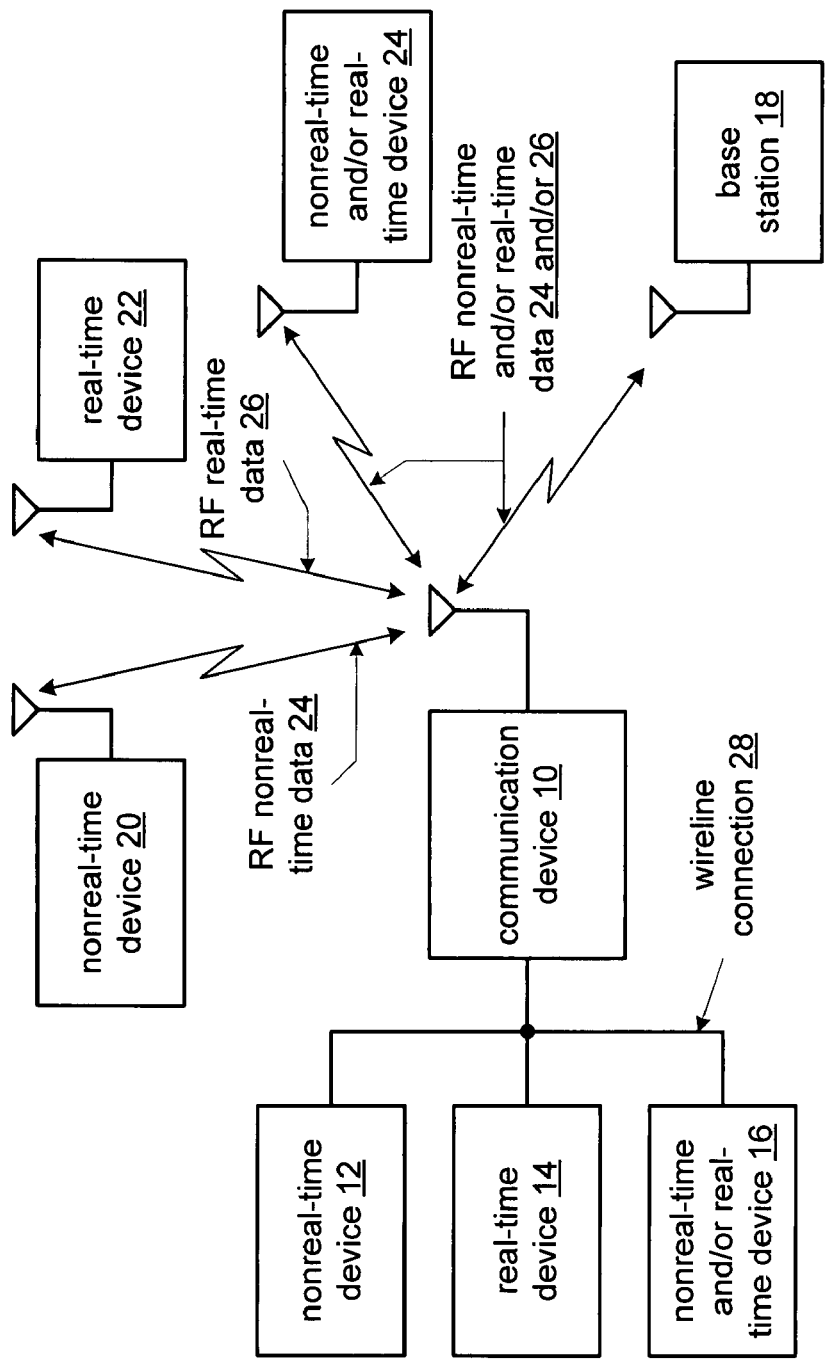
FIG. 1 is a schematic block diagram of an embodiment of a communication system in accordance with the present invention.

FIG. 1 is a schematic block diagram of an embodiment of a communication system in accordance with the present invention. In particular a communication system is shown that includes a communication device 10 that communicates real-time data 24 and non-real-time data 26 wirelessly with one or more other devices such as base station 18, non-real-time device 20, real-time device 22, and non-real-time and/or real-time device 24. In addition, communication device 10 can also optionally communicate over a wireline connection with non-real-time device 12, real-time device 14 and non-real-time and/or real-time device 16.

In an embodiment of the present invention the wireline connection 28 can be a wired connection that operates in accordance with one or more standard protocols, such as a universal serial bus (USB), Institute of Electrical and Electronics Engineers (IEEE) 488, IEEE 1394 (Firewire), Ethernet, small computer system interface (SCSI), serial or parallel advanced technology attachment (SATA or PATA), or other wired communication protocol, either standard or proprietary. The wireless connection can communicate in accordance with a wireless network protocol such as IEEE 802.11, Bluetooth, Ultra-Wideband (UWB), WIMAX, or other wireless network protocol, a wireless telephony data/voice protocol such as Global System for Mobile Communications (GSM), General Packet Radio Service (GPRS), Enhanced Data Rates for Global Evolution (EDGE), Personal Communication Services (PCS), or other mobile wireless protocol or other wireless communication protocol, either standard or proprietary. Further, the wireless communication path can include separate transmit and receive paths that use separate carrier frequencies and/or separate frequency channels. Alternatively, a single frequency or frequency channel can be used to bi-directionally communicate data to and from the communication device 10.

Communication device 10 can be a mobile phone such as a cellular telephone, a personal digital assistant, game console, personal computer, laptop computer, or other device that performs one or more functions that include communication of voice and/or data via wireline connection 28 and/or the wireless communication path. In an embodiment of the present invention, the real-time and non-real-time devices 12, 14 16, 18, 20, 22 and 24 can be personal computers, laptops, PDAs, mobile phones, such as cellular telephones, devices equipped with wireless local area network or Bluetooth transceivers, FM tuners, TV tuners, digital cameras, digital camcorders, or other devices that either produce, process or use audio, video signals or other data or communications.

In operation, the communication device includes one or more applications that include voice communications such as standard telephony applications, voice-over-Internet Protocol (VoIP) applications, local gaming, Internet gaming, email, instant messaging, multimedia messaging, web browsing, audio/video recording, audio/video playback, audio/video downloading, playing of streaming audio/video, office applications such as databases, spreadsheets, word processing, presentation creation and processing and other voice and data applications. In conjunction with these applications, the real-time data 26 includes voice, audio, video and multimedia applications including Internet gaming, etc. The non-real-time data 24 includes text messaging, email, web browsing, file uploading and downloading, etc.

In an embodiment of the present invention, the communication device 10 includes an integrated circuit, such as a combined voice, data and RF integrated circuit that includes one or more features or functions of the present invention. Such integrated circuits shall be described in greater detail in association with FIGS. 3-14 that follow.

Figure 2:
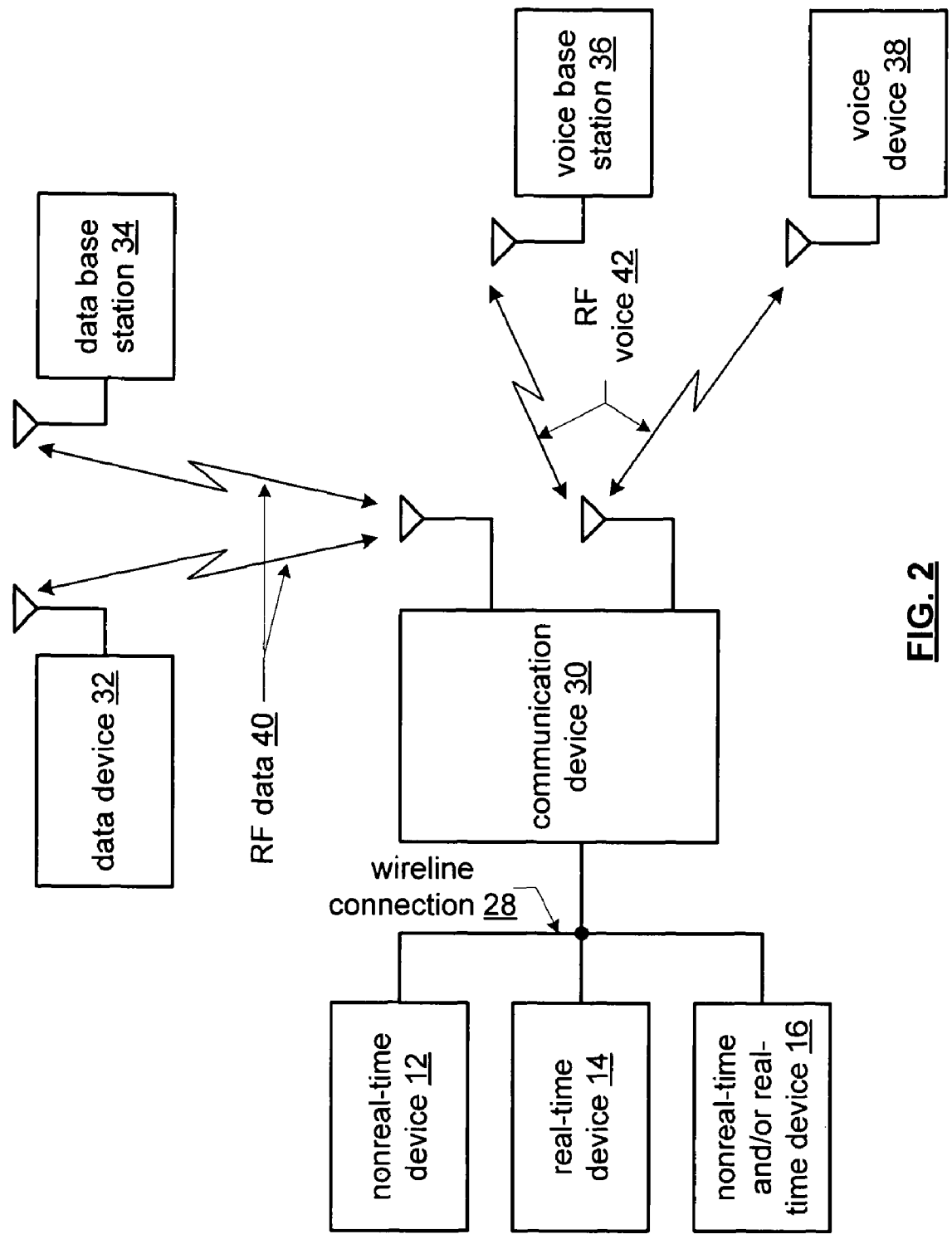
FIG. 2 is a schematic block diagram of an embodiment of another communication system in accordance with the present invention.

FIG. 2 is a schematic block diagram of an embodiment of another communication system in accordance with the present invention. In particular, FIG. 2 presents a communication system that includes many common elements of FIG. 1 that are referred to by common reference numerals. Communication device 30 is similar to communication device 10 and is capable of any of the applications, functions and features attributed to communication device 10, as discussed in conjunction with FIG. 1. However, communication device 30 includes two separate wireless transceivers for communicating, contemporaneously, via two or more wireless communication protocols with data device 32 and/or data base station 34 via RF data 40 and voice base station 36 and/or voice device 38 via RF voice signals 42.

Figure 3:
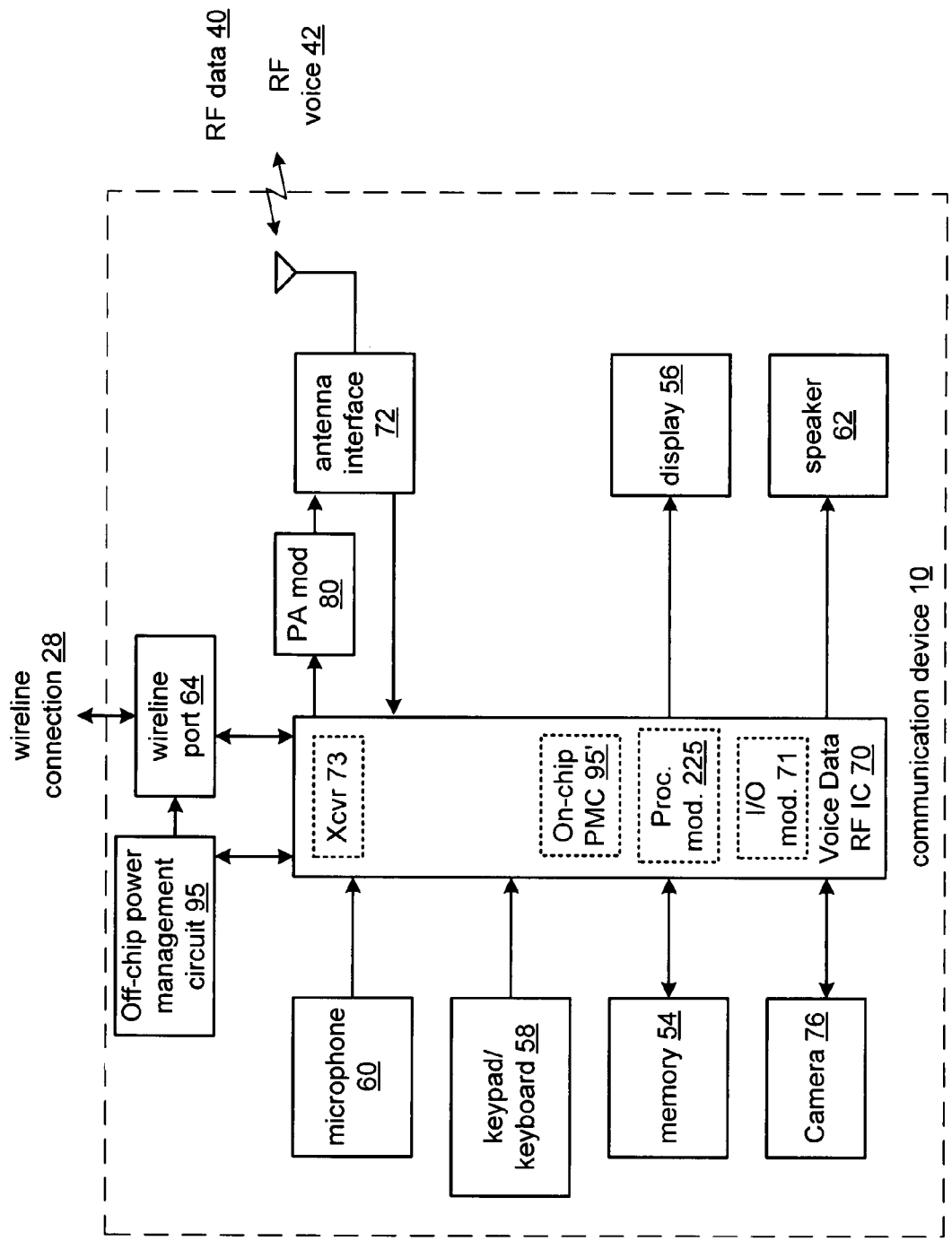
FIG. 3 is a schematic block diagram of an embodiment of an integrated circuit in accordance with the present invention.

FIG. 3 is a schematic block diagram of an embodiment of an integrated circuit in accordance with the present invention. In particular, a voice data RF integrated circuit (IC) 50 is shown that implements communication device 10 in conjunction with microphone 60, keypad/keyboard 58, memory 54, speaker 62, display 56, camera 76, antenna interface 52 and wireline port 64. In addition, voice data RF IC 50 includes a transceiver 73 with RF and baseband modules for formatting and modulating data and voice signals into RF real-time data 26 and non-real-time data 24 and transmitting this data via an off-chip power amplifier module 80 and antenna interface 72 and an antenna, and for receiving RF data and RF voice signals via the antenna. Further, voice data RF IC 50 includes an input/output module 71 with appropriate encoders and decoders for communicating via the wireline connection 28 via wireline port 64, an optional memory interface for communicating with off-chip memory 54, a codec for encoding voice signals from microphone 60 into digital voice signals, a keypad/keyboard interface for generating data from keypad/keyboard 58 in response to the actions of a user, a display driver for driving display 56, such as by rendering a color video signal, text, graphics, or other display data, and an audio driver such as an audio amplifier for driving speaker 62 and one or more other interfaces, such as for interfacing with the camera 76 or the other peripheral devices.

Off-chip power management circuit 95 includes one or more DC-DC converters, voltage regulators, current regulators or other power supplies for supplying the voice data RF IC 50 and optionally the other components of communication device 10 and/or its peripheral devices with supply voltages and or currents (collectively power supply signals) that may be required to power these devices. Off-chip power management circuit 95 can operate from one or more batteries, line power and/or from other power sources, not shown. In particular, off-chip power management module can selectively supply power supply signals of different voltages, currents or current limits or with adjustable voltages, currents or current limits in response to power mode signals received from the voice data RF IC 50. Voice Data RF IC 50 optionally includes an on-chip power management circuit 95' for replacing the off-chip power management circuit 95.

In an embodiment of the present invention, the voice data RF IC 50 is a system on a chip integrated circuit that includes at least one processing device. Such a processing device, for instance, processing module 225, may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The associated memory may be a single memory device or a plurality of memory devices that are either on-chip or off-chip such as memory 54. Such a memory device may be a read-only memory, random access memory, volatile memory, non-volatile memory, static memory, dynamic memory, flash memory, and/or any device that stores digital information. Note that when the Voice Data RF IC 50 implements one or more of its functions via a state machine, analog circuitry, digital circuitry, and/or logic circuitry, the associated memory storing the corresponding operational instructions for this circuitry is embedded with the circuitry comprising the state machine, analog circuitry, digital circuitry, and/or logic circuitry.

In operation, the voice data RF IC 50 executes operational instructions that implement one or more of the applications (real-time or non-real-time) attributed to communication devices 10 and 30 as discussed in conjunction with FIGS. 1 and 2. Further, RF IC 50 includes off-chip power amplifier control features in accordance with the present invention that will be discussed in greater detail in association with FIG. 5.

Figure 4:
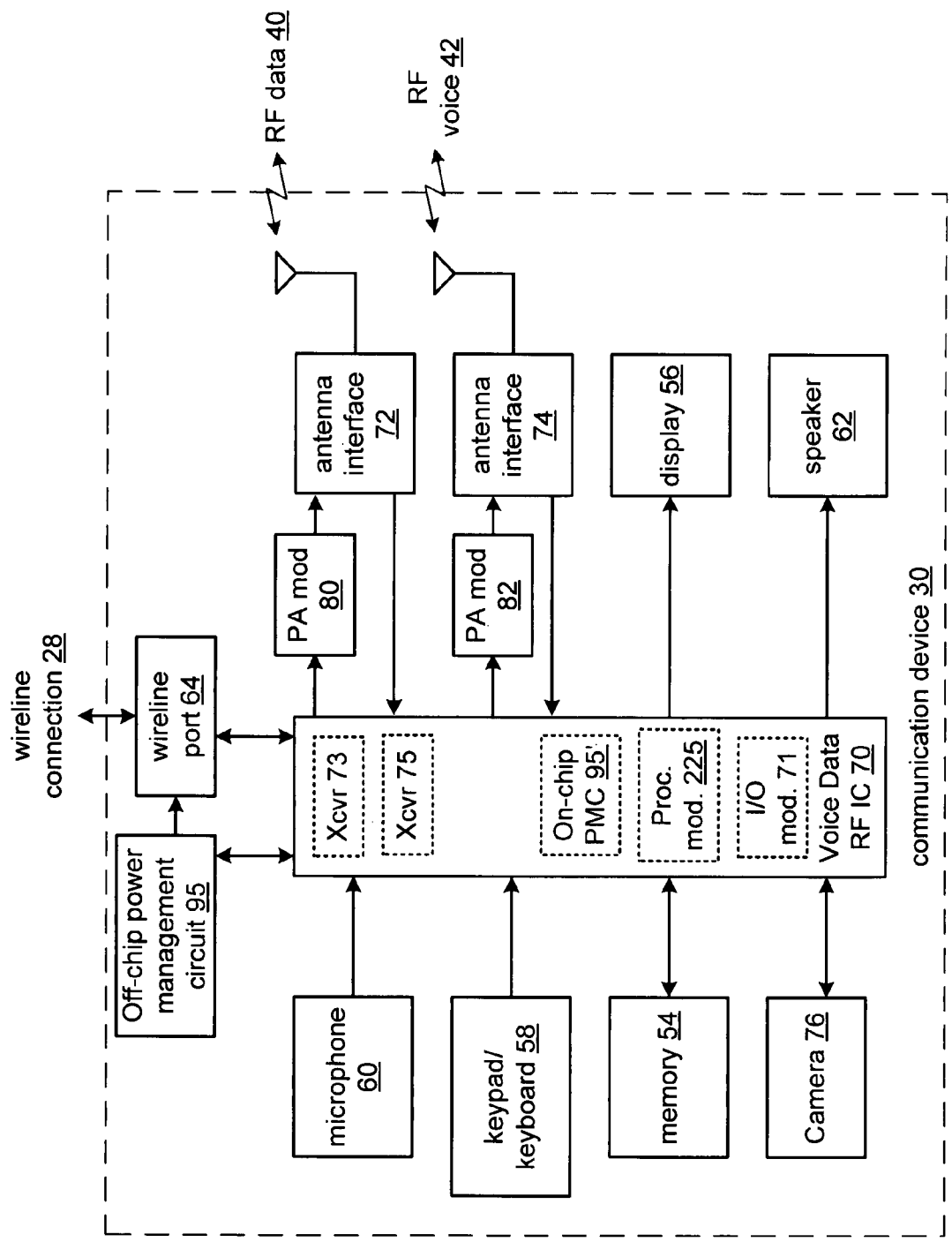
FIG. 4 is a schematic block diagram of another embodiment of an integrated circuit in accordance with the present invention.

FIG. 4 is a schematic block diagram of another embodiment of an integrated circuit in accordance with the present invention. In particular, FIG. 4 presents a communication device 30 that includes many common elements of FIG. 3 that are referred to by common reference numerals. Voice data RF IC 70 is similar to voice data RF IC 50 and is capable of any of the applications, functions and features attributed to voice data RF IC 50 as discussed in conjunction with FIG. 3. However, voice data RF IC 70 includes two separate wireless transceivers 73 and 75 for communicating, contemporaneously, via two or more wireless communication protocols via RF data 40 and RF voice signals 42.

In operation, the voice data RF IC 70 executes operational instructions that implement one or more of the applications (real-time or non-real-time) attributed to communication device 10 as discussed in conjunction with FIG. 1. Further, RF IC 70 includes off-chip power amplifier control features in accordance with the present invention that will be discussed in greater detail in association with FIG. 5.

Figure 5:
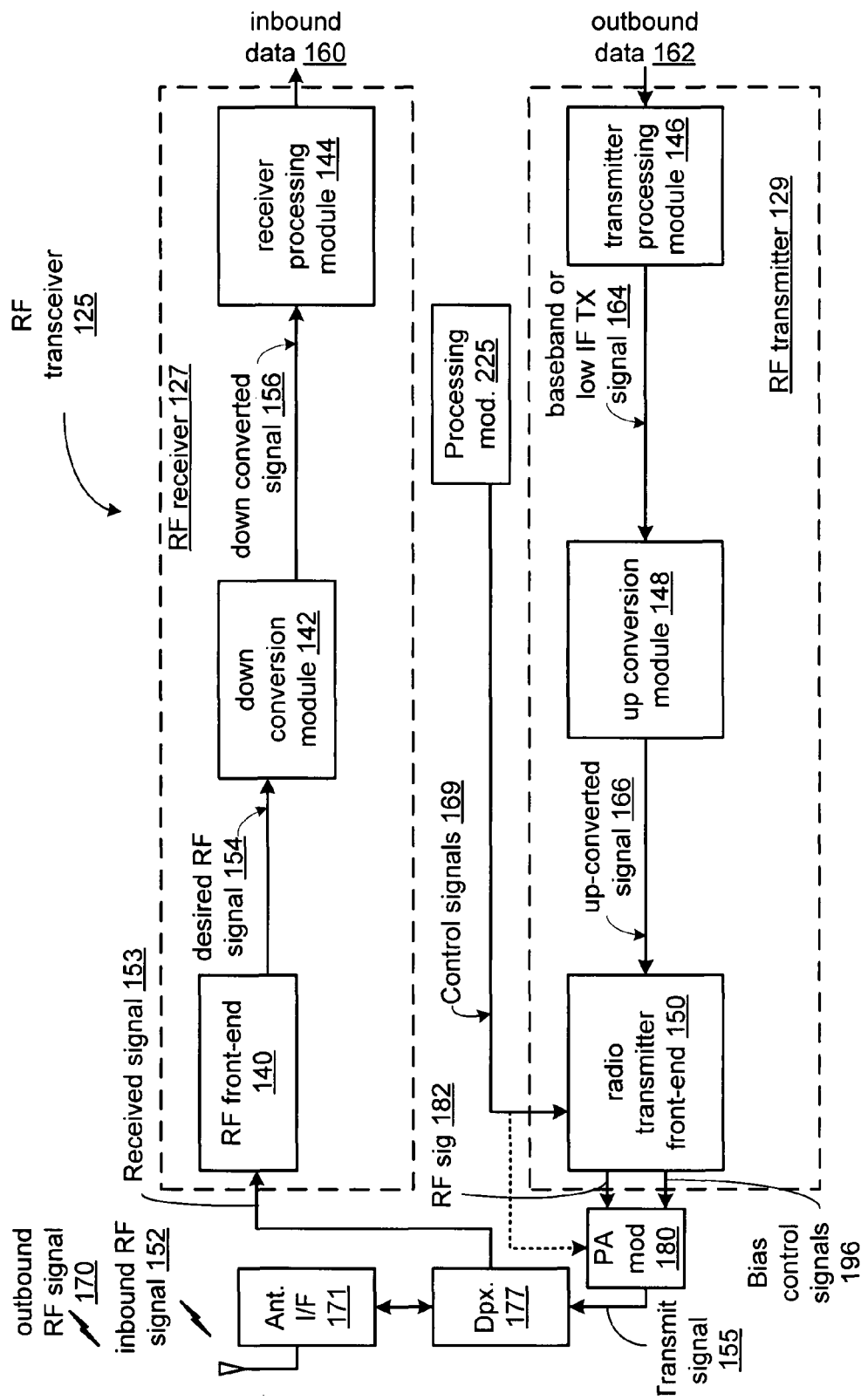
FIG. 5 is a schematic block diagram of an embodiment of an RF transceiver in accordance with the present invention.

FIG. 5 is a schematic block diagram of an RF transceiver 125, such as transceiver 73 or 75, which may be incorporated in communication devices 10 and/or 30. The RF transceiver 125 includes an RF transmitter 129, an RF receiver 127 coupled to the processing module 225. The RF receiver 127 includes a RF front end 140, a down conversion module 142, and a receiver processing module 144. The RF transmitter 129 includes a transmitter processing module 146, an up conversion module 148, and a radio transmitter front-end 150.

As shown, the transmitter is coupled to an antenna through an off-chip power amplifier module 180, off-chip antenna interface 171 and a diplexer (duplexer) 177, that couples the transmit signal 155 to the antenna to produce outbound RF signal 170 and couples inbound RF signal 152 to produce received signal 153. While a diplexer is shown a transmit receive switch could likewise be employed for the same purpose. While a single antenna is represented, the receiver and transmitter may each employ separate antennas or share a multiple antenna structure that includes two or more antennas. In another embodiment, the receiver and transmitter may share a multiple input multiple output (MIMO) antenna structure that includes a plurality of antennas. Each antenna may be fixed, programmable, an antenna array or other antenna configuration. Accordingly, the antenna structure of the wireless transceiver could also depend on the particular standard (s) to which the wireless transceiver is compliant and the applications thereof.

In operation, the transmitter receives outbound data 162 from a host device or other source via the transmitter processing module 146. The transmitter processing module 146 processes the outbound data 162 in accordance with a particular wireless communication standard (e.g., IEEE 802.11, Bluetooth, RFID, GSM, CDMA, et cetera) to produce baseband or low intermediate frequency (IF) transmit (TX) signals 164. The baseband or low IF TX signals 164 may be digital baseband signals (e.g., have a zero IF) or digital low IF signals, where the low IF typically will be in a frequency range of one hundred kilohertz to a few megahertz. Note that the processing performed by the transmitter processing module 146 includes, but is not limited to, scrambling, encoding, puncturing, mapping, modulation, and/or digital baseband to IF conversion. Further note that the transmitter processing module 146 may be implemented using a shared processing device, individual processing devices, or a plurality of processing devices and may further include memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the processing module 146 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

The up conversion module 148 includes a digital-to-analog conversion (DAC) module, a filtering and/or gain module, and a mixing section. The DAC module converts the baseband or low IF TX signals 164 from the digital domain to the analog domain. The filtering and/or gain module filters and/or adjusts the gain of the analog signals prior to providing it to the mixing section. The mixing section converts the analog baseband or low IF signals into up converted signals 166 based on a transmitter local oscillation 168.

The radio transmitter front end 150 includes a driver for producing an RF signal 182 that drives off-chip power amplifier module 180, such as power amplifier module 180 and may also include a transmit filter module. The power amplifier module 180 amplifies the RF signals 182 to produce transmit signal 155 and ultimately outbound RF signals 170, which may be filtered by the transmitter filter module, if included. The antenna structure transmits the outbound RF signals 170 to a targeted device such as a RF tag, base station, an access point and/or another wireless communication device via an antenna interface 171 coupled to an antenna that provides impedance matching and optional bandpass and/or notch filtration.

The receiver receives inbound RF signals 152 via the antenna and off-chip antenna interface 171 that operates to process the inbound RF signal 152 into received signal 153 for the receiver front-end 140. In general, antenna interface 171 provides impedance matching of antenna to the RF front-end 140 and optional bandpass and/or notch filtration of the inbound RF signal 152.

The down conversion module 70 includes a mixing section, an analog to digital conversion (ADC) module, and may also include a filtering and/or gain module. The mixing section converts the desired RF signal 154 into a down converted signal 156 that is based on a receiver local oscillation 158, such as an analog baseband or low IF signal. The ADC module converts the analog baseband or low IF signal into a digital baseband or low IF signal. The filtering and/or gain module high pass and/or low pass filters the digital baseband or low IF signal to produce a baseband or low IF signal 156. Note that the ordering of the ADC module and filtering and/or gain module may be switched, such that the filtering and/or gain module is an analog module.

The receiver processing module 144 processes the baseband or low IF signal 156 in accordance with a particular wireless communication standard (e.g., IEEE 802.11, Bluetooth, RFID, GSM, CDMA, et cetera) to produce inbound data 160. The processing performed by the receiver processing module 144 includes, but is not limited to, digital intermediate frequency to baseband conversion, demodulation, demapping, depuncturing, decoding, and/or descrambling. Note that the receiver processing modules 144 may be implemented using a shared processing device, individual processing devices, or a plurality of processing devices and may further include memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the receiver processing module 144 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, processing module 225 determines a selected one of the plurality of modes, such as based on current use characteristics of the at least one application, the particular application being executed, such as any of the applications discussed in conjunction with communication devices 10 or 30 or based on other factors defined by the operational instructions being executed. In addition, processing module 225 generates a control signal 169 based on the selected one of the plurality of modes.

In an embodiment of the present invention the plurality of modes can correspond to a plurality of power ranges such as a low power mode, a medium power mode, a high power mode, etc, and or a plurality of modes that correspond to different wireless protocols, such as IEEE 802.11, Bluetooth, RFID, GSM, CDMA, EDGE, 3G, UMTS modes, and/or or other modes of operation. The control signal 169 can include a power mode or other mode and be used by the radio transmitter front end 150 to generate bias control signals 196 to off-chip power amplifier module 180 to control the biasing of the power amplifier module 180 based on the particular mode, as will be discussed further in conjunction with FIGS. 6 & 7. In addition, the power amplifier configuration of power amplifier module 180 can optionally be changed based on the mode indicated by the control signal or signals 169 as will be discussed further in conjunction with FIG. 7. Further, the power supply signals generated to power the power amplifier module 180 can be modified in response to the control signals 169 to adapt to the particular mode of operation, as will be discussed further in conjunction with FIGS. 6-9.

Figure 6:
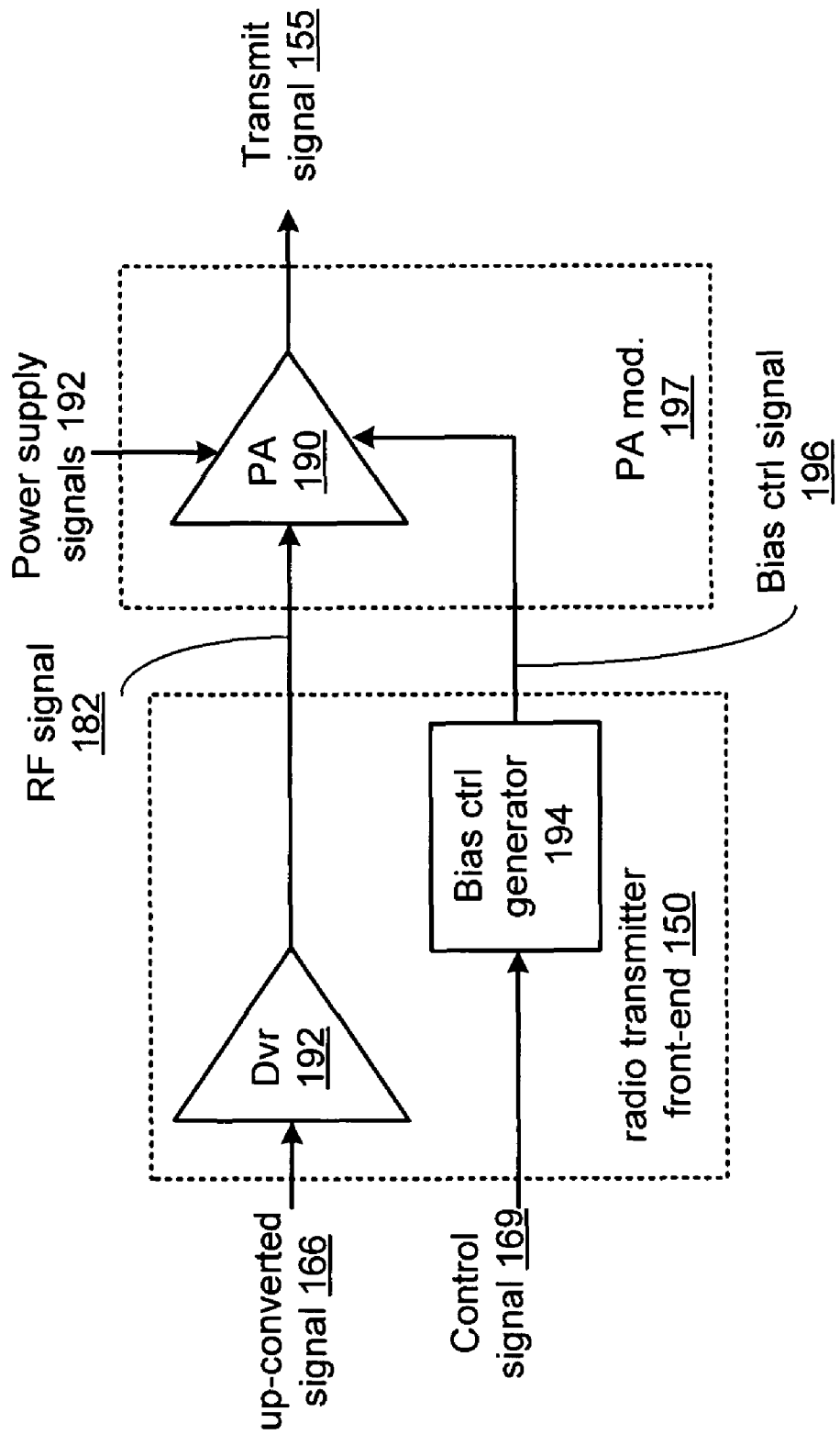
FIG. 6 is a schematic block diagram of an embodiment of a radio transmitter front-end and power amplifier module in accordance with the present invention.

FIG. 6 is a schematic block diagram of an embodiment of a radio transmitter front-end and power amplifier module in accordance with the present invention. In particular, radio transmitter front end 150 includes a driver 192 for producing RF signal 182 in response to up-converted signal 166. Driver 192 can be designed to match the signal magnitudes and impedance expected by off-chip power amplifier module 197. A bias control generator 194 generates a bias control signal 196 in response to the control signal 169, to control the biasing of the off-chip power amplifier module 197.

In an embodiment of the present invention, bias control generator 194 responds to the mode, such as the power mode, the particular standard, or other mode of operation to adjust the biasing of the power amplifier 190 of power amplifier module 197 to conform to the expected operation of the power amplifier 190. For example, power amplifier 190 can operate in a plurality of modes such as in a low, medium and high power mode, and/or GSM mode, EDGE mode, UMTS mode, etc. The supply voltage or current limit of power supply signals 192 can be also be modified by the power management circuit 95 or 95' and/or additional power supply signals 192 can be supplied, based on the selected mode of operation. A high current limit and/or high voltage can correspond to a high power mode. A medium current limit and/or medium supply voltage can correspond to the medium power mode. Further, a low current limit and/or low supply voltage can correspond to the low power mode, all with appropriate biasing controlled by bias control signal 196. In an embodiment of the present invention, bias control generator 194 receives control signal 169 as a digital input that is used by analog or digital circuitry, such as a processor, shared processor, state machine, logic array, or other circuitry to generate the bias control signal 196 as an analog voltage that biases one or more elements such as power transistors, output stage transistors or other circuit elements of power amplifier 190 to conform to the selected mode.

While power amplifier module 197 is shown as off-chip, power amplifier module 197 can, in an alternative embodiment of the present invention be implemented on voice data RF IC 50 or 70.

Figure 7:
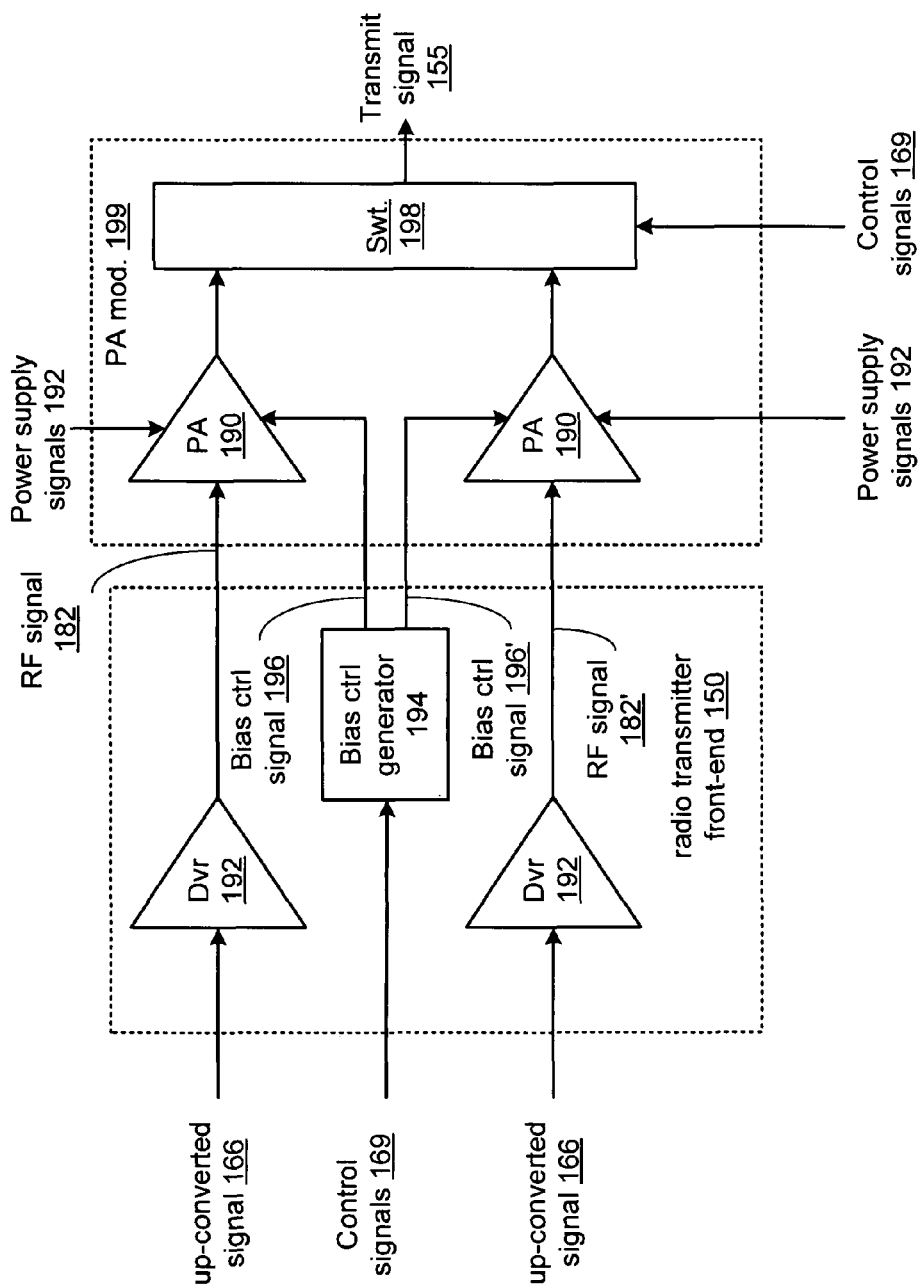
FIG. 7 is a schematic block diagram of another embodiment of a radio transmitter front-end and power amplifier module in accordance with the present invention.

FIG. 7 is a schematic block diagram of another embodiment of a radio transmitter front-end and power amplifier module in accordance with the present invention. This embodiment includes several common elements that from FIG. 6 that are referred to by common reference numerals. However, power amplifier module 199 includes two or more power amplifiers 190 that are driven by separate drivers 192 of radio transmitter front end 150, that are each designed for one or more different modes of operation. Based on the particular mode or operation, one or another of the plurality of power amplifiers is utilized, with switching network 198 coupling transmit signal 155 from one of the plurality of power amplifiers 190 in response to the control signal 169, based on either RF signal 182 or RF signal 182'. The bias control generator 194 generates a bias control signal (196 or 196') to a selected one of the plurality of power amplifiers in response to the control signal 169. In addition, power management circuit 95 or 95' generates power supply signals 192 to the off-chip power amplifier module 199 for powering a selected one of the plurality of power amplifiers 190, in response to the at least one control signal 169. In this fashion, only the particular power amplifier 190 that is in use is powered in order to conserve power. As with power amplifier module 197, power amplifier module 199 can optionally be implemented on voice data and RF IC 50 or 70.

Figure 8:
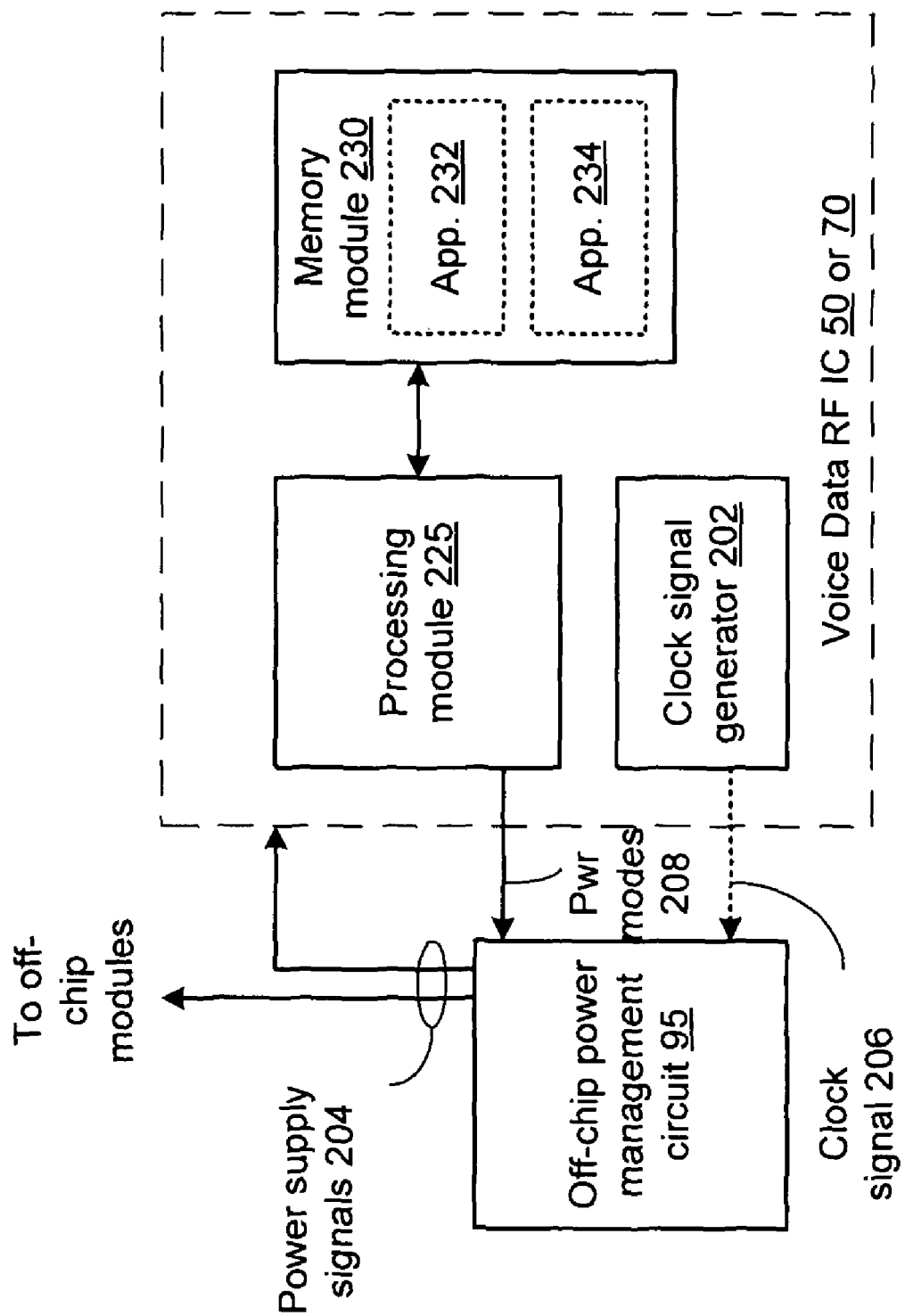
FIG. 8 is a schematic block diagram of an embodiment of power management circuitry in accordance with the present invention.

FIG. 8 is a schematic block diagram of an embodiment of power management circuitry in accordance with the present invention. In particular, selected modules of voice data RF IC 50 or 70 are shown that include processing module 225, memory module 230, and clock signal generator 202. In an embodiment of the present invention, memory module 230 stores a least one application, such as application 232 and/or application 234 that may include any of the applications discussed in conjunction with FIGS. 1-4, as well as other interface applications, system utilities, or other programs executed by processing module 225 to perform the functions and features of communication device 10 or 30. These applications are stored in memory module 230 and/or an off-chip memory such as memory 54, as a plurality of operational instructions. Depending on which application is being executed by the processing module 225, the use characteristics of that application at a given time or the particular application being executed may be used to determine a mode that corresponds to a power level or range or power levels, or a wireless communication standard to be used for the RF transmitter 129.

Off-chip power management circuit 95 receives the control signal 169 as part of power mode signals 208 and generates a plurality of power supply signals 204 to power off-chip modules and on-chip modules that are currently in use and at least one selected transmitter power supply signal that is based on the control signal 169 and the current power mode or RF transmitter 129. For example, the various power modes of RF transmitter 129 can include a low, medium and high power ranges of power levels. Control signal 169, included in power mode signals 208, can inform the off-chip power management circuit of the selected power mode of the RF transmitter 129 so that off-chip power management circuit 95 can supply the necessary power supply signals 204 to meet the power demands of the selected mode of operation. This methodology allows power to be generated for the RF transmitter, only as required to address the current power mode in use.

Also, if communication device 10 or 30 is using certain peripheral devices and/or certain interfaces or modules at a given time, off-chip power management circuit 95 can be commanded to supply only those power supply signals 204 that are required based on the peripheral devices, interfaces and/or other modules that are in use. Further, if a USB device is coupled to wireline port 64, then a power mode command can be sent to off-chip power management module 95 to generate a power supply signal 204 that supplies a power supply voltage, (such as a 5 volt, 8 milliamp supply voltage) to the wireline port 64 in order to power the USB device or devices connected thereto. In another example, if the communication device 10 includes a mobile communication device that operates in accordance with a GSM or EDGE wireless protocol, the off-chip power management circuit 95 can generate supply voltages for the baseband and RF modules of the transceiver only when the transceiver is operating.

Further, peripheral devices, such as the camera 76, memory 54, keypad/keyboard 58, microphone 60, display 56, and speaker 62 can be powered when these peripheral devices are attached (to the extent that they can be detached) and to the extent that these devices are currently in use by the application.

The power management features of the present invention operate based on the processing module determining, for the current application being executed with corresponding current use characteristics, the current power mode of a plurality of power modes. In particular, processing module 225 when executing the application, selects a current power mode based on current use characteristics of the application, and generates a power mode signal 208 based on the selected power modes. In an embodiment of the present invention, processing module 225 maintains a register that indicates for a plurality of modules, interfaces and/or peripheral devices either, whether that device is currently being used or a power flag, such as power off, power on, high power, low power, medium power, etc, for that particular device, module and/or interface (when these devices are themselves capable in operating in different power modes). In addition, processing module, via look-up table, calculation or other processing routine, determines power mode 208 by determining the particular power supply signals required to be generated based on the devices in use and optionally their own power states.

The off-chip power management circuit 95 can be implemented as a multi-output programmable power supply, that receives the power mode signal 208 and generates and optionally routes the power supply signals 204 to particular ports, pins or pads of voice data RF IC 50 or 70 or directly to peripheral devices via a switch matrix, as commanded based on the power mode signal. In an embodiment of the present invention, the power mode signal 208 is decoded by the off-chip power management module to determine the particular power supply signals to be generated, and optionally—their characteristics such as voltage, current and/or current limit. As shown, voice data RF IC 50 or 70 optionally generates a clock signal 206 via clock signal generator 202, or otherwise couples a clock signal 206 generated off-chip to the off-chip power management circuit 95. The off-chip power management circuit 95 operates based on the clock signal 206.

In an embodiment of the present invention, voice data RF IC 50 or 70 couples the power mode signal 208 to the off-chip power management circuit 95 via one or more dedicated digital lines that comprise a parallel interface. Further, the voice data RF IC 50 or 70 can couple the power mode signal 208 to the off-chip power management circuit via a serial communication interface such as an I²C interface, serial/deserializer (SERDES) interface or other serial interface.

Figure 9:
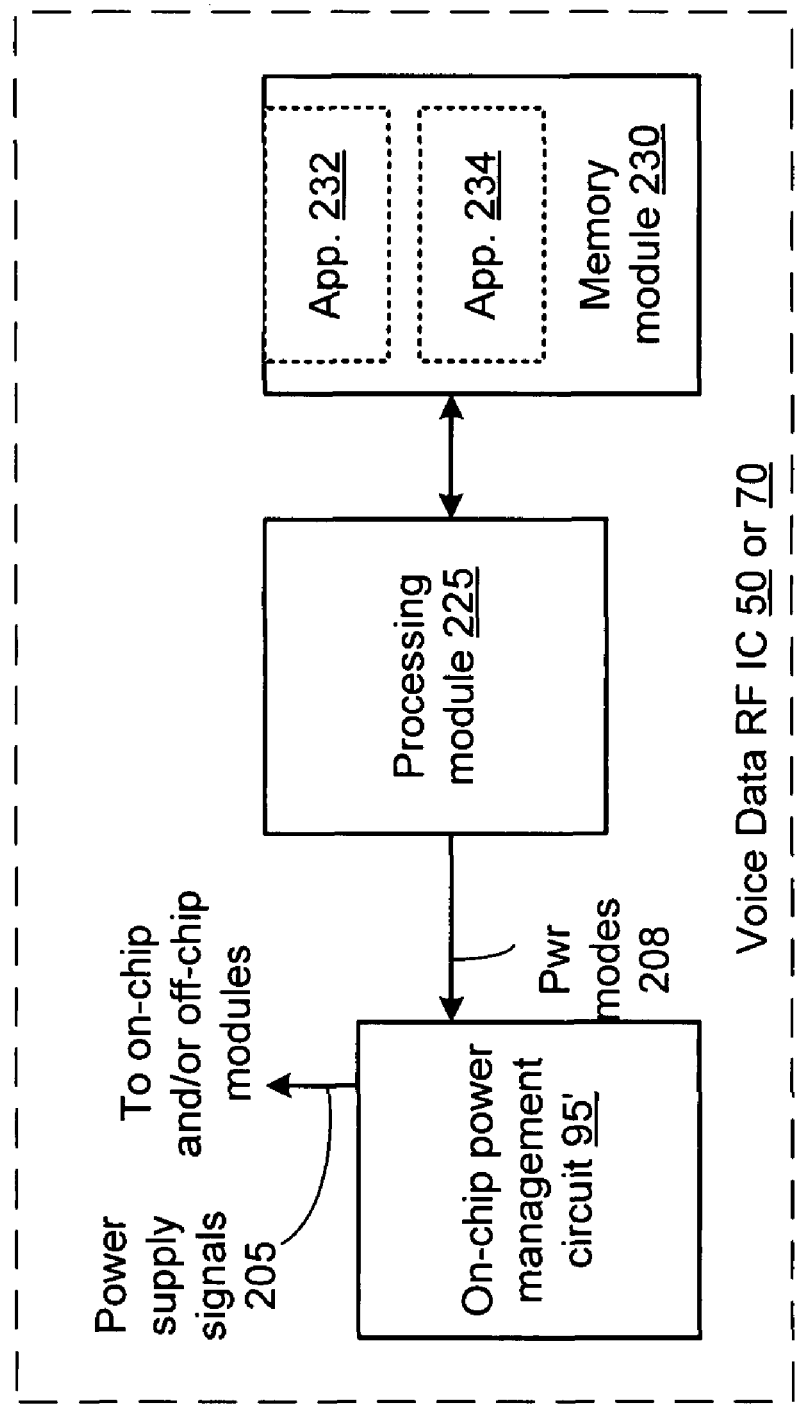
FIG. 9 is a schematic block diagram of another embodiment of power management circuitry in accordance with the present invention.

FIG. 9 is a schematic block diagram of another embodiment of power management circuitry in accordance with the present invention. This embodiment includes similar elements described in conjunction with FIG. 8 that are referred to by common reference numerals. In particular, on-chip power management circuit 95' includes one or more DC-DC converters, voltage regulators, current regulators or other power supplies for supplying the voice data RF IC 50 or 70, and optionally the other components of communication device 10 and/or its peripheral devices with supply voltages and or currents (collectively power supply signals) that may be required to power these devices. On-chip power management circuit 95' can operate from one or more batteries, line power and/or from other power sources, not shown. In particular, on-chip power management module 95' can selectively supply power supply signals of different voltages, currents or current limits or with adjustable voltages, currents or current limits in response to power mode signals 208 received from processing module 225. In this fashion, on-chip power management circuit 95 operates as off-chip power management module 95, but on an on-chip basis.

Figure 10:
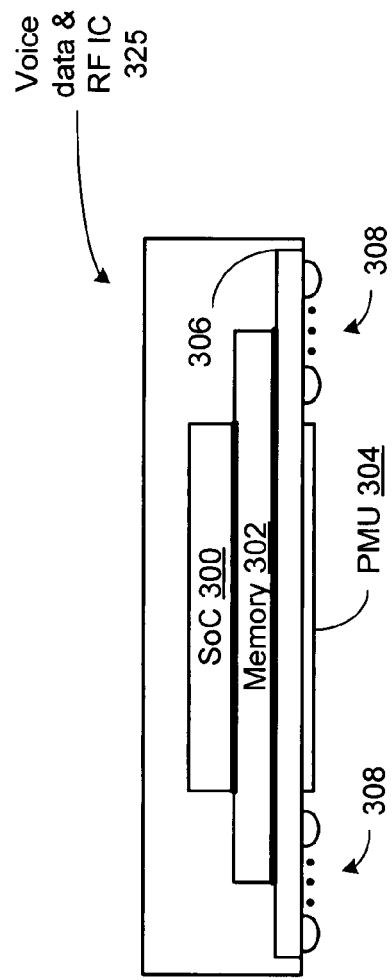
FIG. 10 is a side view of a pictorial representation of an integrated circuit package in accordance with the present invention.

FIG. 10 is a side view of a pictorial representation of an embodiment of an integrated circuit package in accordance with the present invention. Voice data and RF IC 325, such as voice data and RF IC 50 or 70, includes a system on a chip (SoC) die 300, a memory die 302 a substrate 306, bonding pads 308 and power management unit (PMU) 308, such as on-chip power management circuit 95'. This figure is not drawn to scale, rather it is meant to be a pictorial representation that illustrates the juxtaposition of the SoC die 300, memory die 302, PMU 304 and the bonding pads 308. In particular, the voice data and RF IC 325 is integrated in a package with a top and a bottom having a plurality of bonding pads 308 to connect the voice data and RF IC 325 to a circuit board, and wherein the on-chip power management unit 325 is integrated along the bottom of the package. In an embodiment of the present invention, die 302 includes the memory module 230 and die 300 includes the processing module 225. These dies are stacked and die bonding is employed to connect these two circuits and minimize the number of bonding pads, (balls) out to the package. Both SoC die 300 and memory die 302 are coupled to respective ones of the bonding pads 308 via bonding wires or other connections.

PMU 304 is coupled to the SoC die 300, and/or the memory die 302 via conductive vias, bonding wires, bonding pads or by other connections. The positioning of the PMU on the bottom of the package in a flip chip configuration allows good heat dissipation of the PMU 304 to a circuit board when the voice data and RF integrated circuit is installed.

Figure 11:
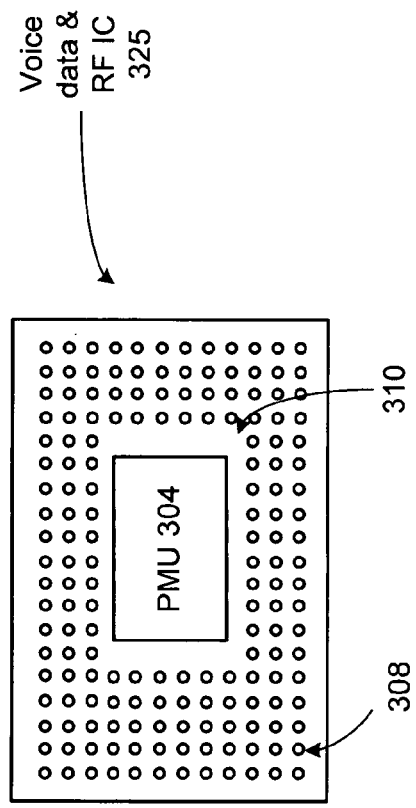
FIG. 11 is a bottom view of a pictorial representation of an integrated circuit package in accordance with the present invention.

FIG. 11 is a bottom view of a pictorial representation of an embodiment of an integrated circuit package in accordance with the present invention. As shown, the bonding pads (balls) 308 are arrayed in an area of the bottom of the integrated circuit with an open center portion 310 and wherein the on-chip power management unit (PMU 304) is integrated in the open center portion. While a particular pattern and number of bonding pads 308 are shown, a greater or lesser number of bonding pads can likewise be employed with alternative configurations within the broad scope of the present invention.

Figure 12:
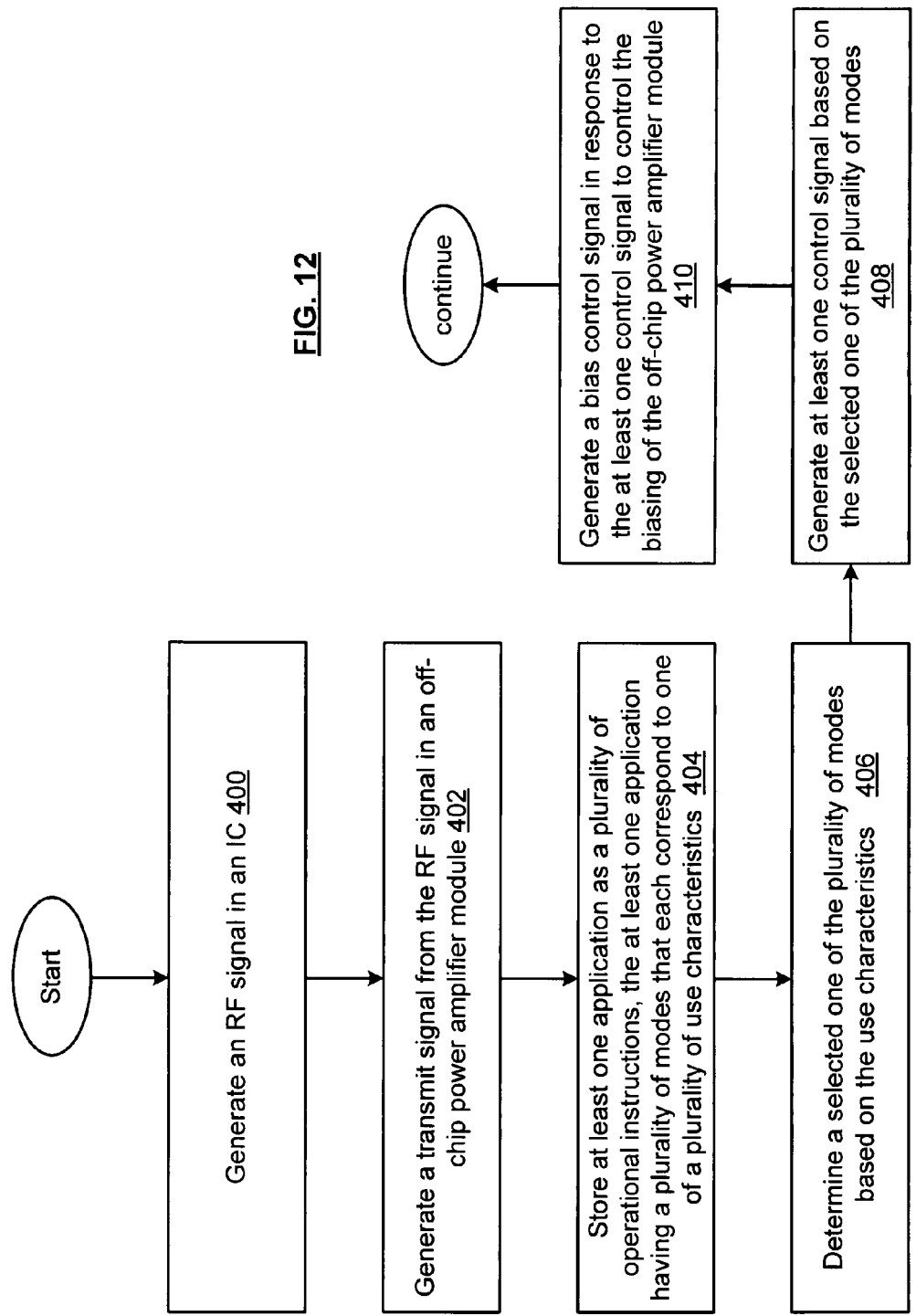
FIG. 12 is a flow chart of an embodiment of a method in accordance with the present invention.

FIG. 12 is a flow chart of an embodiment of a method in accordance with the present invention. In particular, a method is presented for use in conjunction with one or more of the functions and features described in conjunction with FIGS. 1-12. In step 400, an RF signal is generated in an integrated circuit. In step 402, a transmit signal is generated from the RF signal in an off-chip power amplifier module. In step 404, a least one application is stored as a plurality of operational instructions, the at least one application having a plurality of modes that each correspond to one of a plurality of use characteristics. In step 406, a selected one of the plurality of modes is selected based on current use characteristics of the at least one application. In step 408, at least one control signal is generated based on the selected one of the plurality of modes. In step 410, a bias control signal is generated in response to the at least one control signal to control the biasing of the off-chip power amplifier module.

In an embodiment of the present invention, step 410 generates a bias control signal to a selected one of the plurality of power amplifiers in response to the at least one control signal. Further, the plurality of modes can include a high power mode and a low power mode and/or a first wireless mode corresponding to a first wireless standard and a second wireless mode corresponding to a second wireless standard.

Figure 13:
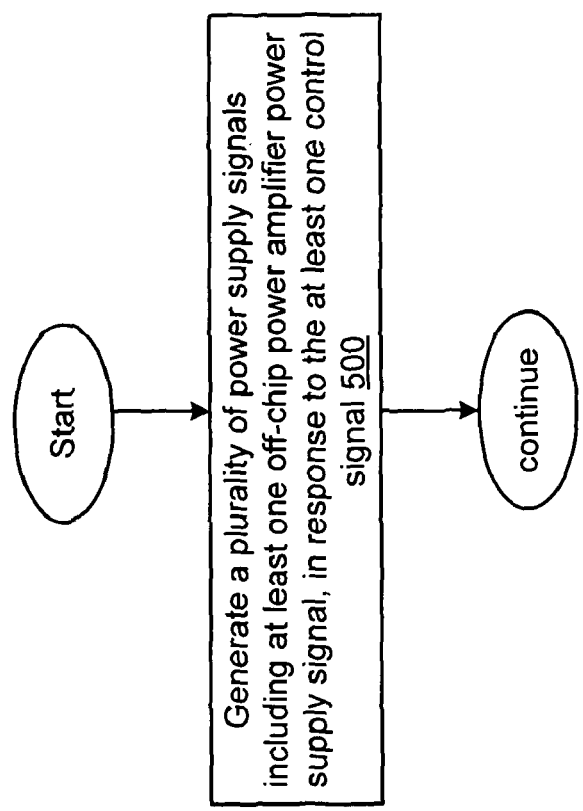
FIG. 13 is a flow chart of an embodiment of a method in accordance with the present invention.

FIG. 13 is a flow chart of an embodiment of a method in accordance with the present invention. In particular, a method is presented that can be used in conjunction with the method of FIG. 12. In addition, the method includes step 500 of generating a plurality of power supply signals including at least one off-chip power amplifier power supply signal, in response to the at least one control signal.

Figure 14:
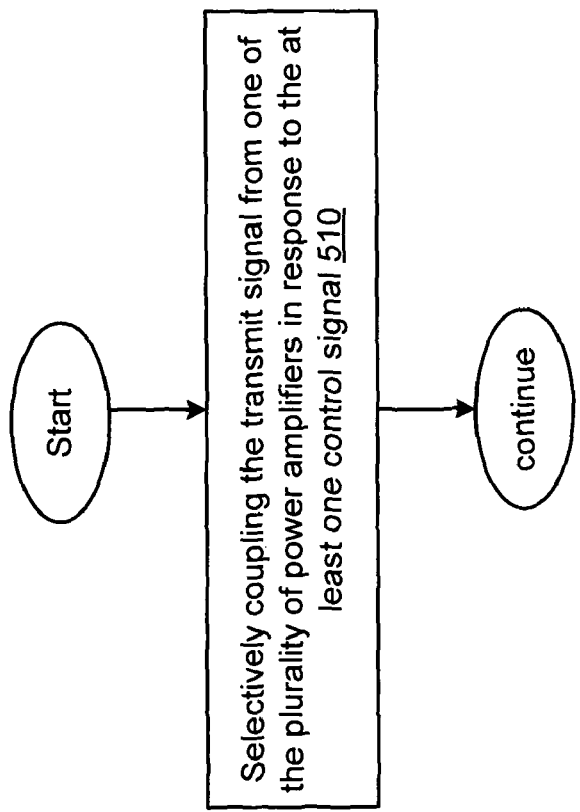
FIG. 14 is a flow chart of an embodiment of a method in accordance with the present invention.

FIG. 14 is a flow chart of an embodiment of a method in accordance with the present invention. In particular, a method is presented that can be used in conjunction with the method of FIGS. 12-13, wherein the off-chip power amplifier module includes a plurality of power amplifiers and a switching network coupled to the plurality of power amplifiers. This method further includes step 510 of selectively coupling the transmit signal from one of the plurality of power amplifiers in response to the at least one control signal.

Figure 15:
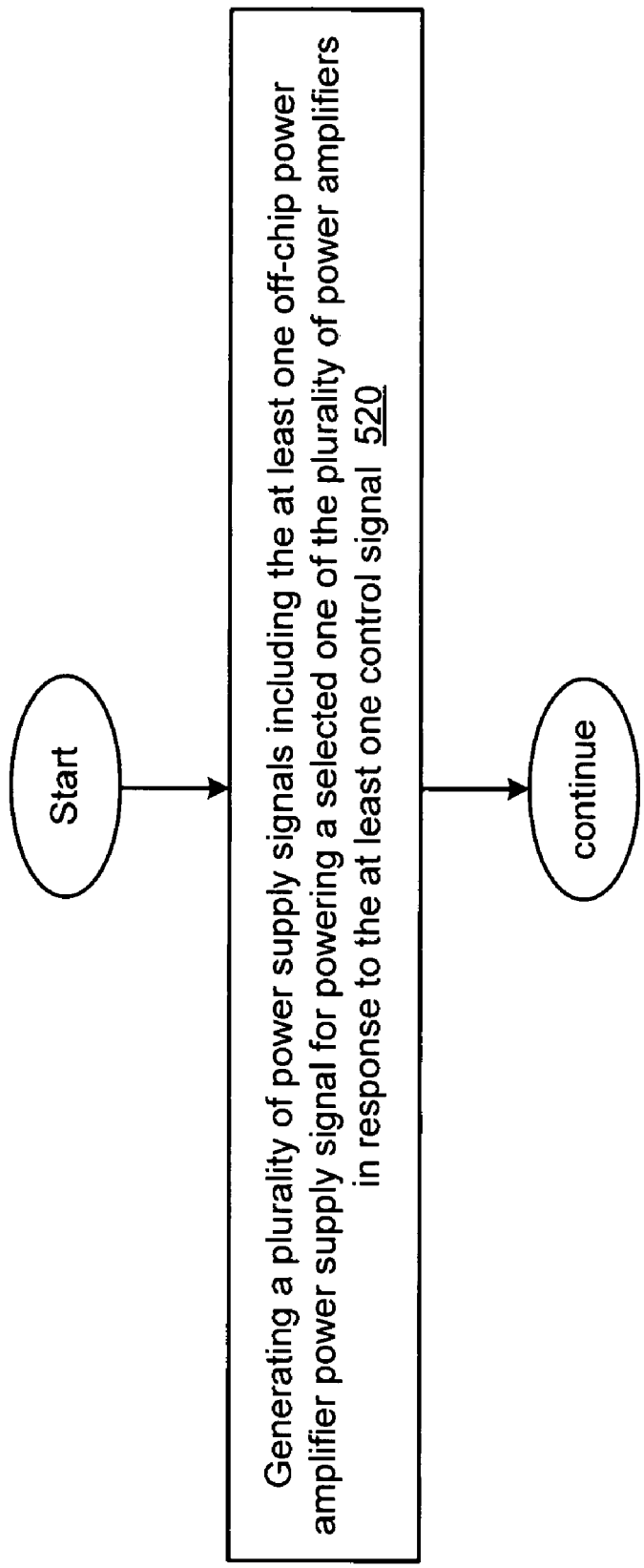
FIG. 15 is a flow chart of an embodiment of a method in accordance with the present invention.

FIG. 15 is a flow chart of an embodiment of a method in accordance with the present invention. In particular, a method is presented that can be used in conjunction with the method of FIGS. 12-14. In addition, the method includes step 520 of generating a plurality of power supply signals including at least one off-chip power amplifier power supply signal for powering a selected one of the plurality of power amplifiers, in response to the at least one control signal.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output (s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A voice data and RF integrated circuit (IC) comprising:
an RF transmitter, that generates an RF signal to a power amplifier module wherein the power amplifier module includes a plurality of power amplifiers and a switching network coupled to the plurality of power amplifiers, the switching network coupling a transmit signal from a selected one of the plurality of power amplifiers in response to at least one control signal;
a memory module that stores at least one application as a plurality of operational instructions, the at least one application having a plurality of modes that each correspond to one of a plurality of use characteristics, wherein the plurality of modes include a first wireless mode corresponding to a first wireless standard and a second wireless mode corresponding to a second wireless standard;
a processing module, coupled to the memory module and the power amplifier module, that executes the plurality of operational instructions and that determines a selected one of the plurality of modes based on current use characteristics of the at least one application, and generates the at least one control signal based on the selected one of the plurality of modes; and
a bias control generator, coupled to the processing module and the power amplifier module, that generates a bias control signal in response to the at least one control signal, to control the biasing of the power amplifier module to a first bias for the first wireless mode and to a second bias for the second wireless mode, wherein the bias control generator generates a bias control signal to the selected one of the plurality of power amplifiers in response to the at least one control signal; and
a power management circuit, coupled to the processing module and the power amplifier module, that generates a plurality of power supply signals including at least one power amplifier power supply signal for selectively powering only the selected one of the plurality of power amplifiers, in response to the at least one control signal, wherein the power management circuit is bonded to a bottom of the RFIC so as to dissipate heat to a printed circuit board.

2. The voice data and RF IC of claim 1 wherein the bottom of the RFIC further includes a plurality of bonding elements for providing electrical connections to the printed circuit board.

3. The voice data and RF IC of claim 1 wherein the plurality of modes include a high power mode and a low power mode.

4. A communication device comprising:
an RF (radio frequency) transmitter included in an RF integrated circuit, that generates an RF signal;
an off-chip power amplifier module, coupled to the RF transmitter, that generates a transmit signal from the RF signal, wherein the off-chip power amplifier module includes a plurality of power amplifiers and a switching network coupled to the plurality of power amplifiers, the switching network coupling a transmit signal from a selected one of the plurality of power amplifiers in response to at least one control signal;
a memory module that stores a least one application as a plurality of operational instructions, the at least one application having a plurality of modes that each correspond to one of a plurality of use characteristics, wherein the plurality of modes include a first wireless mode corresponding to a first wireless standard and a second wireless mode corresponding to a second wireless standard;
a processing module, coupled to the memory module and the off-chip power amplifier module, that executes the plurality of operational instructions and that determines a selected one of the plurality of modes based on current use characteristics of the at least one application, and generates the at least one control signal based on the selected one of the plurality of modes; and
a bias control generator, coupled to the processing module and the off-chip power amplifier module, that generates a bias control signal in response to the at least one control signal, to control the biasing of the off-chip power amplifier module to a first bias for the first wireless mode and to a second bias for the second wireless mode, wherein the bias control generator generates a bias control signal to the selected one of the plurality of power amplifiers in response to the at least one control signal; and
a power management circuit, coupled to the processing module and the off-chip power amplifier module, that generates a plurality of power supply signals including at least one power amplifier power supply signal for selectively powering only the selected one of the plurality of power amplifiers, in response to the at least one control signal, wherein the power management circuit is bonded to a bottom of the RF integrated circuit so as to dissipate heat to a printed circuit board.

5. The communication device of claim 4 wherein the plurality of modes include a high power mode and a low power mode.

6. A method comprising:
generating an RF signal in an integrated circuit;
generating a transmit signal from the RF signal in an off-chip power amplifier module wherein the off-chip power amplifier module includes a plurality of power amplifiers and a switching network coupled to the plurality of power amplifiers;
storing a least one application as a plurality of operational instructions, the at least one application having a plurality of modes that each correspond to one of a plurality of use characteristics, wherein the plurality of modes include a first wireless mode corresponding to a first wireless standard and a second wireless mode corresponding to a second wireless standard;
determining a selected one of the plurality of modes based on current use characteristics of the at least one application;
generating at least one control signal based on the selected one of the plurality of modes;
selecting one of the plurality of power amplifiers in response to the at least one control signal via the switching network;
coupling a transmit signal from the selected one of the plurality of power amplifiers via the switching network;
generating a bias control signal in response to the at least one control signal to control the biasing of the off-chip power amplifier module to a first bias for the first wireless mode and to a second bias for the second wireless mode, wherein the bias control signal is generated to the selected one of the plurality of power amplifiers in response to the at least one control signal;
generating, via a power management circuit and in response to the at least one control signal, at least one power amplifier power supply signal for selectively powering only the selected one of the plurality of power amplifiers, wherein the power management circuit is bonded to a bottom of the integrated circuit so as to dissipate heat to a printed circuit board.

7. The method of claim 6 wherein the plurality of modes include a high power mode and a low power mode.

* * * * *